United States Patent [19]

Brady et al.

[11] 4,334,897

[45] Jun. 15, 1982

[54] GAS SCRUBBING APPARATUS

[75] Inventors: Jack D. Brady, Fayetteville; Kenny M. Graves, Jonesboro, both of Ga.

[73] Assignee: Andersen 2000, Inc., Atlanta, Ga.

[21] Appl. No.: 237,292

[22] Filed: Feb. 24, 1981

[51] Int. Cl.[3] .............................................. B01D 47/00
[52] U.S. Cl. ................................. 55/257 PV; 55/440; 261/62; 261/DIG. 54; 261/22; 261/109; 261/118; 261/17
[58] Field of Search .................... 55/85, 89, 90, 93, 94, 55/240, 241, 226, 257 PV, 275 QV, 440, DIG. 30; 181/270, 260, 261; 261/DIG. 54, 22, 116, 118, 17, 117, 62, DIG. 9, 109; 110/215, 216; 432/72

[56] References Cited

U.S. PATENT DOCUMENTS

| | | | |
|---|---|---|---|
| 1,112,860 | 10/1914 | Smith | 261/DIG. 9 |
| 1,877,567 | 9/1932 | Erbes | 181/270 |
| 2,202,272 | 5/1940 | Smith | 181/270 |
| 2,911,011 | 11/1959 | Niehart | 55/440 |
| 3,009,687 | 11/1961 | Hendriks | 261/DIG. 54 |
| 3,276,193 | 10/1966 | Lamb | 55/440 |
| 3,567,194 | 3/1971 | Shah et al. | 261/118 |
| 3,696,590 | 10/1972 | Richmond | 261/79 A |
| 3,745,748 | 7/1973 | Goldfield et al. | 55/97 |
| 3,747,347 | 7/1973 | Ciraola | 55/DIG. 30 |
| 3,880,597 | 4/1975 | Goldsmidt et al. | 261/DIG. 9 |
| 4,150,953 | 4/1979 | Woodmouser | 55/73 |

FOREIGN PATENT DOCUMENTS

303997 1/1929 United Kingdom ............... 181/270

Primary Examiner—Bernard Nozick
Attorney, Agent, or Firm—B. J. Powell

[57] ABSTRACT

Gas scrubbing apparatus for removing sulfur dioxide from a gas stream with a cleaning liquid capable of absorbing the sulfur dioxide in the gas stream comprising a housing defining scrubbing chamber therein, a plurality of baffles in the scrubbing chamber at longitudinally spaced positions therealong for generating turbulence in the gas stream and rotating the gas stream about the central axis of the scrubbing chamber, spray means for spraying the cleaning liquid into the scrubbing chamber between the baffles to absorb the sulfur dioxide from the gas stream, and a mist eliminator downstream of the baffles to remove liquid droplets from the gas stream. The baffles are oriented so that each baffle rotates the gas stream approximately ninety degrees about the central axis of the scrubbing chamber as the gas stream flows thereby with all of the baffles rotating the gas stream in the same direction about said central axis. The apparatus also includes quenching means for cooling and saturating the gas stream prior to passage into the scrubbing chamber. Filtration means may also be provided for removing submicron and larger particulates from the gas stream after passage through the scrubbing chamber.

9 Claims, 16 Drawing Figures

GAS SCRUBBING APPARATUS

BACKGROUND OF THE INVENTION

This invention relates generally to baffle type scrubbers and more particularly to baffle type scrubbers for adsorbing sulfur dioxide gas streams.

Baffle type scrubbers have been available for contacting a gas stream with a cleaning liquid so that the cleaning liquid removes material from the gas stream such as sulfur dioxide. One type of prior art baffle scrubber uses a series of baffles positioned in a gas chamber through which a gas stream passes with the baffles arranged so that they alternately project into the gas chamber from opposite directions at longitudinally spaced apart positions along the gas chamber with their inner edges overlapping. These baffles cause the gas stream to be successively deflected back and forth across the gas chamber as the gas stream moves longitudinally of the gas chamber while the cleaning liquid is sprayed between the baffles to mix with the gas stream being deflected by these baffles. U.S. Pat. No. 4,168,958 shows this type scrubber construction oriented along a vertical axis. The prior art also shows this type scrubber configuration oriented along a horizontal axis.

One of the problems associated with this type of construction is that the gas stream is deflected back and forth within the chamber without rotating about the central axis of the chamber. This makes uniform contact between the cleaning liquid and the gas stream difficult to achieve. Also, when the scrubber is horizontally oriented, the liquid is sprayed into the gas chamber from one direction. Because the gas stream is not rotated about the central axis of the gas stream, the upper portion of the gas stream is subjected to the cleaning liquid while it has a greater capability of removing material from the gas stream thereby causing the lower portion of the gas stream to have less of the desired material removed therefrom than the upper portion. The pressure drop across each of these baffles is relatively high, thereby typically requiring excessive power consumption to force the gas stream through the gas chamber to operate the scrubbing device.

SUMMARY OF THE INVENTION

These and other problems and disadvantages associated with prior art scrubbers are overcome by the invention disclosed herein by providing a scrubber construction in which sufficient turbulence is generated in the gas stream within the scrubbing chamber to cause adequate contact between the gas stream and the cleaning liquid to clean the gas stream, which rotates the gas stream about the axis of the scrubbing chamber so that uniform contact between the gas stream and the cleaning liquid is provided, and which generates a sufficiently low pressure drop therethrough to permit the scrubber construction to operate without necessity of an additional fan to force the gas stream through the scrubbing device. The scrubber construction of the invention includes a housing defining a generally horizontally oriented scrubbing chamber therein in which is positioned a plurality of baffles with each of the baffles rotated 90° with respect to the baffle upstream thereof and with all of the baffles oriented so that they are rotated 90° with respect to the baffle upstream thereof in the same rotational direction so that the gas stream is rotated in a first direction about the axis of the scrubbing chamber as the gas stream passes along the length of the scrubbing chamber. This construction causes the pressure drop across each of the baffles to be greatly reduced as compared to the prior art so that, in most instances, no additional fan is required to force the gas stream through the scrubbing device.

The apparatus of the invention also includes a chevron-type mist eliminator downstream of the baffles to remove any liquid from entrainment in the gas stream. The chevron-type mist eliminator is made of a plurality of metal eliminator plates which have been bent to deflect the gas stream back and forth between the eliminator plates as the gas stream passes therethrough to cause the liquid droplets in the gas stream to impinge on the plate and migrate toward the downstream edge of angled sections in the plate. Each of the mist eliminator plates has a flange section formed at the downstream edge of each of the angled sections in the plate which projects out into the gas stream with the flanges being formed by folding the metal plate back over itself in the flange section so that the flange sections integrally connect the angularly displaced sections of each of the mist eliminator plates.

The apparatus of the invention also includes a filtration system communicating with the downstream end of said scrubber construction for removing micron and submicron size particulates from the gas stream after passage through the scrubbing device. The filtration system includes a high energy filtration device, fan means for forcing the gas stream through the high energy filtration device to operate same and cyclone separator means for removing any liquid droplets from the gas stream after passage through the high energy filtration device.

These and other features and advantages of the invention disclosed herein will become more clearly understood upon consideration of the following detailed description and accompanying drawings wherein like characters of reference designate corresponding parts throughout the several views and in which:

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

Figure 1:
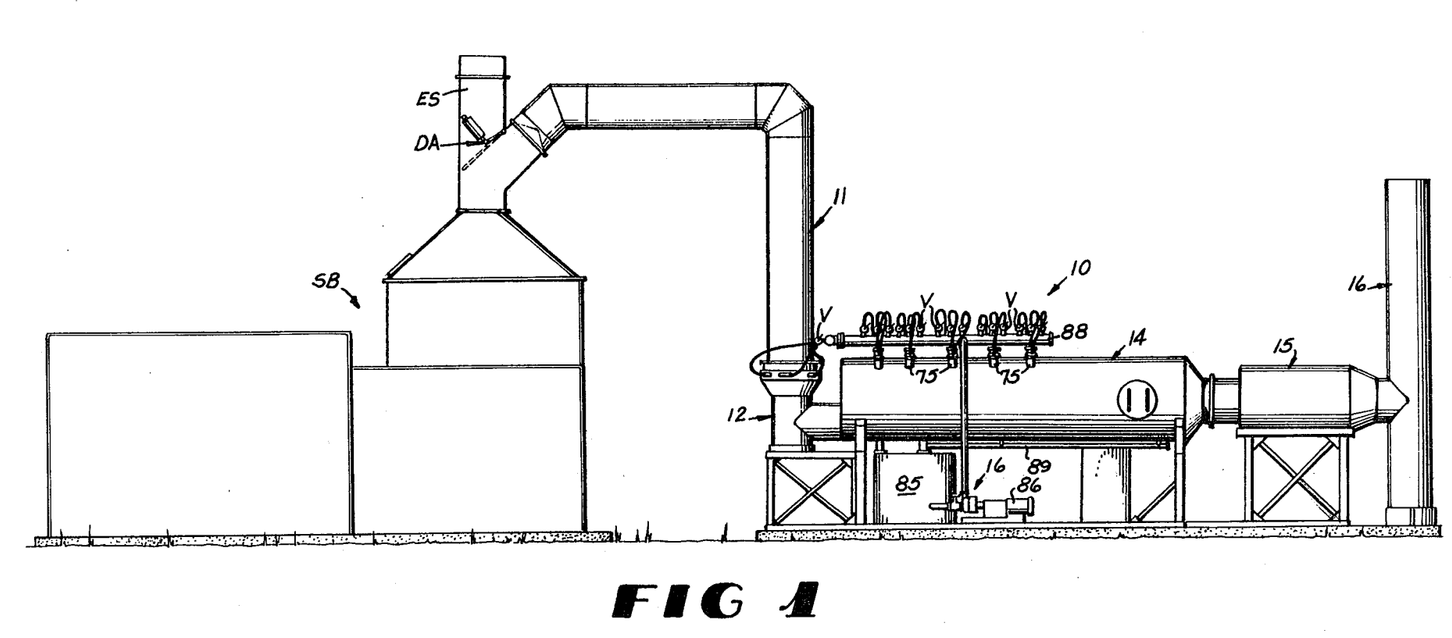
FIG. 1 is a side elevational view showing a typical installation including the invention.
Figure 2:
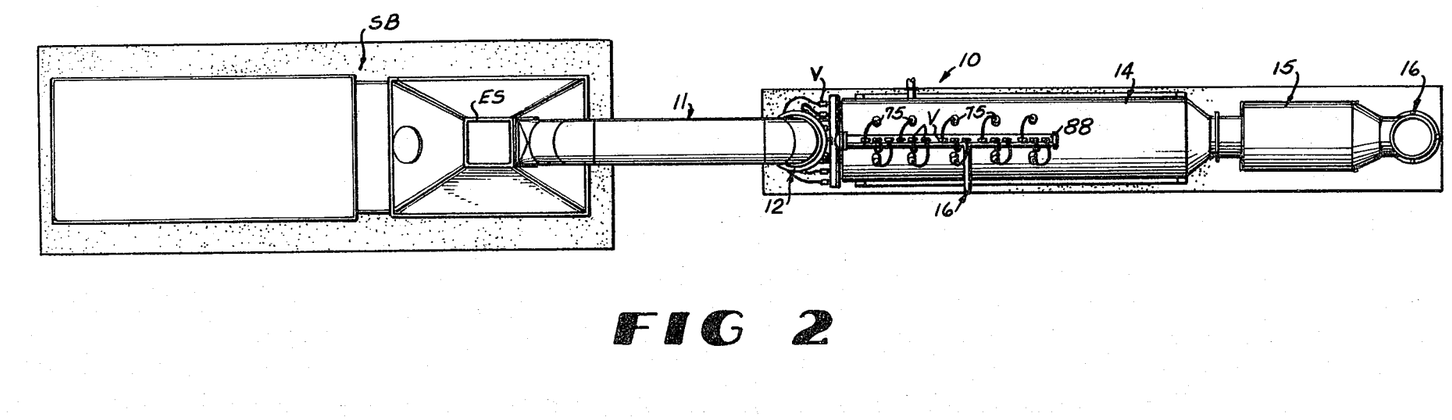
FIG. 2 is a top plan view of the installation shown in FIG. 1.

Referring to FIGS. 1 and 2, the installation including the invention is adapted to clean the flue gases from a steam boiler SB such as those used to supply steam for oil fields. The scrubbing system 10 is connected to the exhaust stack ES of the steam boiler through a transfer pipe unit 11 with a damper assembly DA positioned in the exhaust stack ES so that the flue gases from the steam boiler SB can be selectively diverted through the transfer pipe unit 11 to pass through the scrubbing system 10 or allowed to pass out of the exhaust stack ES. The scrubbing system 10 includes generally a quench section 12 connected to the outlet of a transfer pipe unit 11, a scrubber section 14 connected to the outlet of the quench section 12, a fan section 15 connected to the outlet of the scrubber section 14 and a discharge stack section 16 connected to the outlet of fan section 15 through which the flue gases from the steam boiler SB are eventually discharged. The quench section 12 serves to cool and humidify the flue gases from the steam boiler SB while the scrubber section 14 is designed to scrub the sulfur dioxide from the flue gases as they pass therethrough. The scrubbing system 10 also includes a cleaning liquid supply system 16 which supplies cleaning liquid to the scrubber section 14 and the quench section 12 for reaction with the flue gases.

The quench section 12 includes generally a housing 20 defining a quench chamber 21 therein. The housing 20 includes an inlet pipe 22 which is vertically oriented and connected to the discharge end of the transfer pipe unit 11 so that the flue gases therefrom are directed generally vertically downwardly through the inlet pipe 22 into the quench chamber 21. The inlet pipe 22 is mounted in a conical section 24 having a diameter at its upper end larger than the inlet pipe 22 and tapering inwardly to a diameter at its lower end generally smaller than that of the inlet pipe 22 to maintain constant gas velocity. The inlet pipe 22 is positioned so that its lower end projects into the upper end of the conical section 24 to define an annular recess 25 around the lower end of the inlet pipe 22. A generally vertically oriented lower pipe 26 is connected to the lower end of the conical section 24 and is closed at its lower end by an end plate 28 to complete the formation of the quench chamber 21. A discharge pipe 29 is connected to the lower pipe 26 and is oriented at right angles thereto to form the horizontally oriented outlet from the quench chamber 21.

Figure 5:
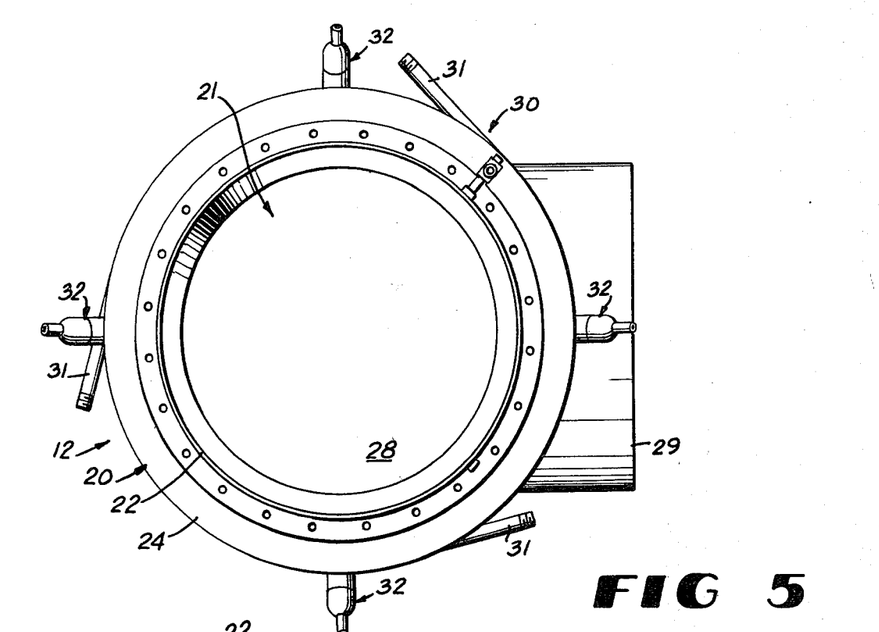
FIG. 5 is an enlarged top view of the quench section of the invention.
Figure 6:
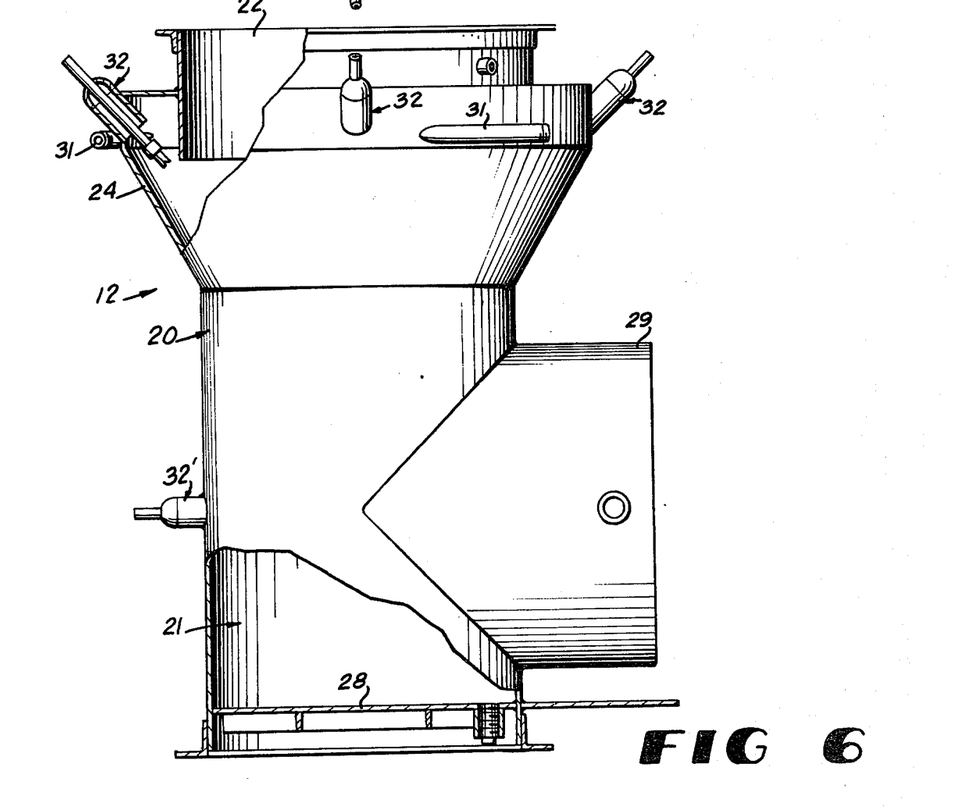
FIG. 6 is an enlarged side elevational view of the quench section of the invention partly broken away to show the internal construction thereof.

A tangential nozzle assembly 30 best seen in FIGS. 5 and 6 is provided at the upper end of the conical section 24 in registration with annular recess 25 to direct streams of the cleaning liquid from the cleaning liquid supply system 16 circumferentially around the conical section 24 so that the cleaning liquid flows tangentially around the conical section 24 and the lower pipe 26 as well as downwardly along the conical section 24 and lower pipe 26 to keep the inside surfaces of the conical section 24 and the lower pipe 26 as well as the end plate closing the lower end of the lower pipe wetted at all times. The tangential nozzle assembly 30 includes a plurality of pipes 31 which project through the conical section 24 and open into the annular recess 25 around the lower end of the inlet pipe 22. The pipes 31 are in turn connected to the cleaning liquid supply system 16 as best seen in FIGS. 1 and 2 through appropriate valves V to supply the cleaning liquid to the conical section 24. This serves to keep the inside surfaces of the conical section 24 and the lower pipe cooled while at the same time preventing the buildup of particulate matter on these inside surfaces.

Figures 7, 8:
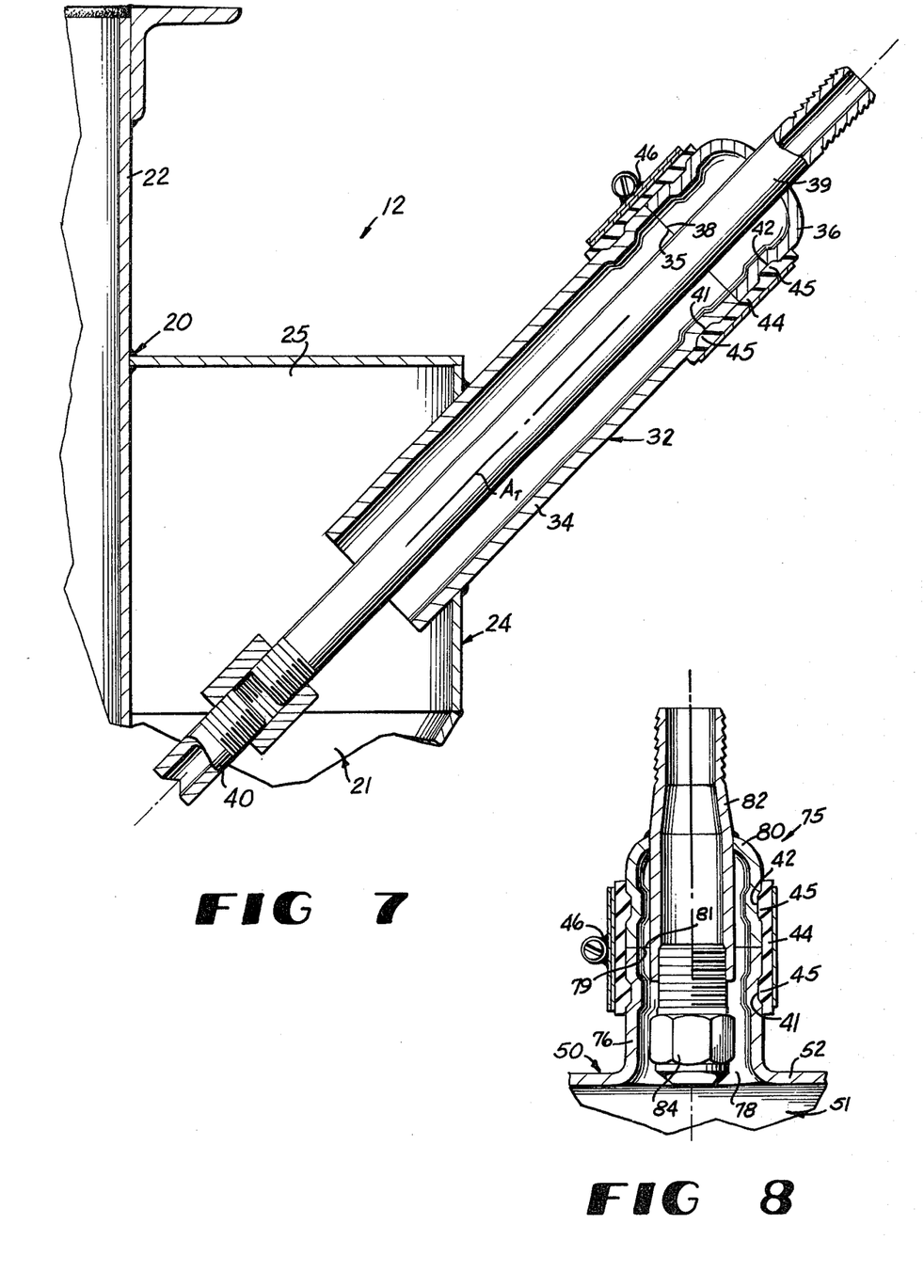
FIG. 7 is an enlarged transverse cross-sectional view of one of the quench spray nozzle constructions.
FIG. 8 is an enlarged longitudinal cross-sectional view of one of the cleaning liquid spray heads for the scrubber section of the invention.

A plurality of angled nozzle assemblies 32 seen in FIGS. 5-7 are provided at the upper end of the conical section 24 at circumferentially spaced positions therearound to direct sprays of the cleaning liquid into the flue gas stream passing out of the lower end of the inlet pipe 22. Each of the angled nozzle assemblies 32 includes a mounting tube 34 projecting through and easily mounted on the conical section 24 adjacent its upper end with its inboard end opening into the annular recess 24 within the conical section 24 and its outboard end opening exteriorly of the conical section 24. The central axis $A_T$ of the mounting tube 34 is angled at the angle at which the cleaning liquid sprays from the angled nozzle assembly 32 are to be directed into the flue gas stream flowing through the quench chamber 21. The outboard end of the mounting tube 34 defines an abutment surface 35 thereon normal to the axis $A_T$. A mounting cap 36 defining an abutting end surface 38 on one end thereof is mounted on the outboard end of the mounting tube 34 with the abutting end surface 38 against the abutment surface 35 on the mounting tube 34. The mounting cap 36 is closed at its outboard end and mounts a liquid supply tube 39 therethrough oriented coaxially of the mounting cap 36 so that the liquid supply tube 39 extends axially through the mounting tube 34 and projects out of the inboard end of the mounting tube 34 into the annular recess 25 in the conical section 24. The inboard end of this liquid supply tube 39 mounts a nozzle 40 thereon whose inwardly projecting end is located within the recess 24 closely adjacent the lower end of the inlet pipe 22 so that the flue gases flowing into the quench chamber 21 out of the inlet pipe 22 do not contact the nozzle 40 while the cleaning liquid discharged from the nozzle 40 is sprayed under the lower end of the inlet pipe 22 and into the flue gases flowing into the quench chamber 21 from the inlet pipe 22. The cleaning liquid sprayed into the quench chamber 21 serves to cool the flue gases from a temperature of 400°–500° F. to a temperature of about 150° F. while at the same time saturating the flue gas stream.

As best seen in FIG. 7, the mounting tube 34 defines an outwardly opening recess 41 therearound adjacent the abutment surface 35 and oriented in a plane generally normal to the tube axis $A_T$. The mounting cap 36 also defines an outwardly opening recess 42 therearound adjacent the abutting end surface 38 lying in a plane generally normal to the mounting cap axis. A cylindrical tubular gasket 44 is provided with a length greater than the distance between the recesses 41 and 42 on the mounting tube 34 and mounting cap 36 so that the tubular gasket 44 can be slipped over the joint at the abutment surface 35 and abutting end surface 38. The tubular gasket 44 defines a pair of inwardly directed annular projections 45 on the inside thereof which are spaced to fit in the recesses 41 and 42 on the mounting tube 34 and the mounting cap 36 when the gasket 44 is in place. An adjustable clamping ring 46 fits around the outside of the tubular gasket 44 and is adjustable to compress the tubular gasket 44 to seal the joint between the mounting tube 34 and mounting cap 36 as the clamping ring 46 is tightened. This allows the liquid supply tube 39 and nozzle 40 to be removed simply by undoing the clamping ring 46 to release the tubular gasket 44 and removing the mounting cap 36 on which the liquid supply tube 39 is mounted.

As best seen in FIGS. 1 and 2, each of the supply tubes 39 is connected to the cleaning liquid supply system 16 through appropriate valves V so that the cleaning liquid is supplied thereto for discharge into the flue gas stream flowing into the quench chamber 21. Thus, it will be seen that the flue gases flow generally vertically downwardly through the quench chamber 21 and pass out of the quench chamber 21 at right angles thereto through the discharge pipe 29 into the scrubber section 14. A nozzle assembly 32' may be provided in the lower pipe 26 opposite the discharge pipe 29 and arranged so that it directs a spray of cleaning fluid co-axially of the discharge pipe 29 to keep it wetted.

The scrubber section 14 seen in FIGS. 1-4 includes an elongate cylindrical housing 50 defining an elongate cylindrical scrubbing chamber 51 therein oriented along a generally horizontal chamber axis $A_C$. The housing 50 includes an annular cylindrical side wall 52 closed at its inlet end by end wall 54 in which is positioned an inlet pipe 55 connected to the discharge pipe 29 on the quench section 12 so that the flue gases therefrom pass into the scrubbing chamber 51 adjacent the bottom thereof. The diameter $d_1$ of the scrubbing chamber 51 is greater than the diameter $d_2$, by a factor sufficient to make transverse cross-sectional area of the scrubbing chamber 51 about five times that of the passage through the inlet pipe 55. The outlet end of the side wall 52 is closed by a conical end wall 56 in which is positioned an outlet pipe 58 having inside diameter $d_3$ about the same as inlet pipe 55.

A set of mixing and rotating baffle assemblies 60 is positioned in the scrubbing chamber 51 which deflects the flue gas stream in the scrubbing chamber 51 to create a mixing turbulence therein as well as rotating the gas stream about the chamber axis $A_C$ as will become more apparent. There are five baffle assemblies 60 illustrated which have been labelled $60_a$–$60_e$. Baffle assembly $60_a$ is the upstreammost baffle assembly while baffle assembly $60_e$ is the downstreammost. Baffle assembly $60_a$ is spaced downstream of the inlet pipe 55 a distance $d_4$ about equal to diameter $d_2$ with each of the other baffle assemblies 60 spaced downstream of baffle assembly $60_a$ a distance $d_4$ from each other.

Each baffle assembly 60 includes a fixed baffle plate 61 mounted on side wall 52 and projecting into the scrubbing chamber 51 normal to axis $A_C$. The fixed baffle plate 61 is semicircular in shape with a semi-circular outer edge 62 of radius $R_1$ equal to about one-half diameter $d_1$ and a straight inner edge 64 extending through the center of curvature of the outer edge 62. The baffle plate 61 thus has a central axis $A_P$ through the center of curvature normal to the inner edge 64. The fixed baffle is attached to the side wall 52 along its outer edge 62 so that the inner edge 64 extends diametrically across the scrubbing chamber 51. The baffle plate 61 is provided with a lip 65 along the inner edge 64 for reinforcement. Thus, it will be seen that each baffle plate 61 blocks about one-half of the transverse cross-sectional area of the scrubbing chamber 51.

Each of the baffle assemblies 60 may also include a rectilinear baffle plate 66 having a length about equal to the radius $R_1$. The baffle plate 66 is adjustably mounted on the fixed baffle plate 61 centrally of the inner edge 64 thereof so that the adjustable baffle plate 66 can be adjustably extended into the scrubbing chamber 51 past the inner edge 64 of the fixed baffle plate 61 with its projecting edge 68 generally parallel to the inner edge 64 of plate 61. The adjustable baffle plate 66 is sized so that, at its projectingmost position, that portion of the scrubbing chamber not blocked by the baffle assembly 60 is always greater than the cross-sectional area of the inlet pipe 55. Because the adjustable baffle plate 66 has a length less than the length of the inner edge 64 of the fixed baffle plate 61, the gas stream flows over the inner edge 64 of the fixed baffle plate 61 around opposite ends of the adjustable baffle plate 66 and over the projecting edge 68 of plate 66 to help generate turbulence in the gas stream as will become more apparent.

The baffle assembly $60_a$ is oriented so that the inner edge 64 on baffle plate 61 is horizontal with the baffle plate 61 blocking the lower portion of the scrubbing chamber 51. This causes the flue gases passing into the scrubbing chamber 51 from the inlet pipe 55 to be deflected upwardly over the inner edge 64 of baffle plate 61 and around the adjustable baffle plate 66. The baffle assembly $60_b$ is oriented so that its central axis $A_P$ is rotated about the chamber central axis $A_C$ ninety degrees in a counterclockwise direction from the central axis $A_P$ of the baffle assembly $60_a$. Thus, the inner edge 64 on baffle plate 61 of the baffle assembly $60_b$ is vertical with the baffle plate 61 extending to the right when viewed from the inlet end of chamber 51. This causes the flue gases passing around the baffle assembly $60_a$ to be deflected to the left over the inner edge 64 on baffle plate 61 and around the adjustable baffle plate 66 of assembly $60_b$. This effectively rotates the flue gas stream about ninety degrees in a counterclockwise direction while at the same time generating sufficient turbulence in the gas stream for good mixing. The baffle assembly $60_c$ is oriented so that its central axis $A_p$ is rotated about the chamber central axis $A_C$ ninety degrees in a counterclockwise direction from the central axis $A_P$ of the baffle assembly $60_b$. Thus, the inner edge 64 on baffle plate 61 of the baffle assembly $60_c$ is horizontal with the baffle plate 61 blocking the upper portion of the scrubbing chamber 51. This causes the gas stream passing around the baffle assembly $60_b$ to be deflected toward the bottom of the scrubbing chamber 51 over the inner edge 64 on baffle plate 61 and around the adjustable baffle plate 66 of assembly $60_c$. This effectively rotates the flue gas stream a further ninety degrees in a counterclockwise direction while at the same time generating sufficient turbulence in the gas stream for good mixing. The baffle assembly $60_d$ is oriented so that its central axis $A_p$ is rotated about the chamber central axis $A_C$ ninety degrees in a counterclockwise direction from the central axis $A_P$ of the baffle assembly $60_c$. Thus, the inner edge 64 on baffle plate 61 of the baffle assembly $60_d$ is vertical with the baffle plate 61 extending to the left when viewed from the inlet end of chamber 51. This causes the flue gases passing around the baffle assembly $60_d$ to be deflected to the right over the inner edge 64 of the baffle plate 61 and around the adjustable baffle plate 66 of assembly $60_d$. This effectively further rotates the flue gas stream about ninety degrees in a counterclockwise direction while at the same time generating sufficient turbulence in the gas stream for good mixing. The baffle assembly $60_e$ is oriented so that its central axis $A_P$ is rotated about the chamber central axis $A_C$ ninety degrees in a counterclockwise direction from the central axis $A_P$ of the baffle assembly $60_d$. Thus, the inner edge 64 on baffle plate 61 of the baffle assembly $60_e$ is horizontal with the baffle plate 61 blocking the lower portion of the scrubbing chamber 51. This causes the flue gases passing over the baffle assembly $60_e$ to be deflected up over the inner edge 64 of the baffle plate 61 and around the adjustable baffle plate 66 of assembly $60_e$. The gas stream is thus further effectively rotated ninety degrees in a counterclockwise direction while at the same time generating sufficient turbulence in the flue gas stream for good mixing.

From the foregoing, it will be seen that the flue gas stream is rotated one complete revolution about the central axis $A_C$ of scrubbing chamber 51 by the baffle assemblies $60_a$–$60_e$ while generating sufficient turbulence therein for good mixing. It will also be appreciated that each of the baffle assemblies 60 may be rotated ninety degrees in a clockwise direction with respect to the adjacent upstream baffle assembly 60 with the same results. The criteria is that all of the baffle assemblies 60 must be rotated ninety degrees in the same direction from the adjacent upstream baffle assembly 60.

A flow straightening baffle 70 is positioned in scrubbing chamber 51 downstream of the baffle assembly $60_e$ and serves to reduce or stop the rotation of the flue gas stream about the chamber axis $A_C$. The flow straightening baffle 70 is spaced downstream of the baffle assembly $60_e$ the distance $d_4$ and corresponds in construction to the fixed baffle plates 61. The baffle 70 is oriented normal to the scrubbing chamber axis $A_C$ and has a semicircular shape with outer semi-circular edge 71 of radius $R_1$ and a straight inner edge 72 diametrically extending across chamber 51. The central axis $A_P$ of baffle 70 is rotated one hundred eighty degrees with respect to the axis $A_P$ of the baffle assembly $60_e$ so that the inner edge 72 of baffle 70 is parallel to the inner edge 62 of the baffle plate 61 in baffle assembly $60_e$ with baffle 70 blocking the upper portion of chamber 51. Thus, the flue gas stream deflected upwardly over baffle assembly $60_e$ is then deflected downwardly under the baffle 70 without the flue gas stream being rotated about the chamber axis $A_C$. The flue gas stream then flows toward the outlet pipe 58 without further rotation about the chamber axis $A_C$.

Figures 3, 4:
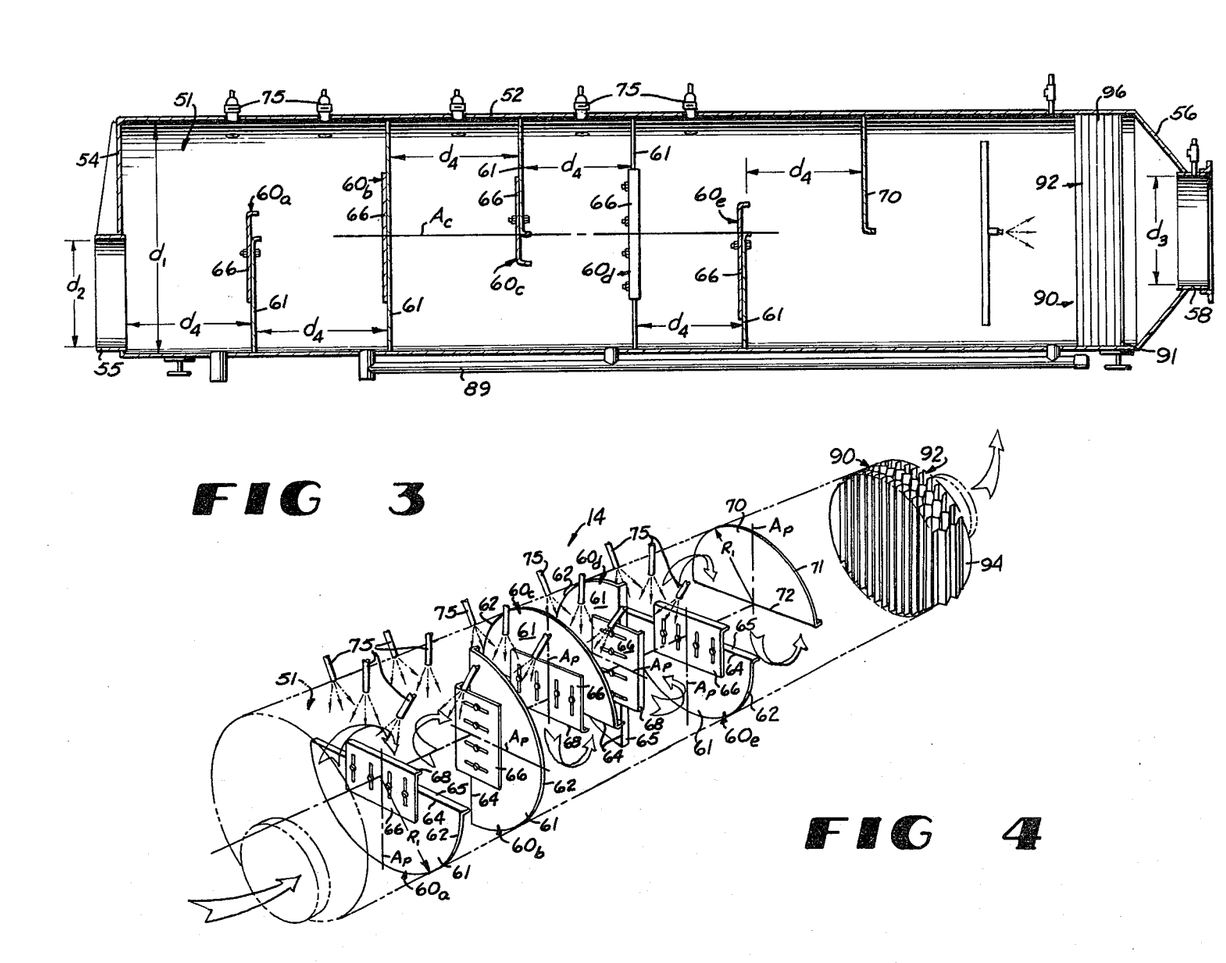
FIG. 3 is an enlarged transverse cross-sectional view of the scrubbing device of the invention.
FIG. 4 is a perspective schematic view illustrating the gas flow path through the scrubbing device of the invention.

A plurality of banks of scrubbing nozzle assemblies 75 are provided along the top of the housing 50 to direct sprays of the cleaning fluid downwardly across the scrubbing chamber 51 to place the cleaning fluid in contact with the flue gas stream. Each bank is illustrated as including three nozzle assemblies 75 but any desired number may be used. One bank of nozzle assemblies 75 is positioned upstream of the baffle assembly $60_a$ while the other banks of nozzle assemblies 75 are located so that one bank is positioned in the space between each pair of adjacent baffle assemblies 60 as best seen in FIGS. 3 and 4.

Each nozzle assembly 75 as best seen in FIG. 8 includes a base tube 76 integral with the side wall 52 of housing 50 and projecting outwardly of the side wall 52 along a tube axis $A_H$ normal to the scrubbing chamber axis $A_C$ and extending radially of scrubbing chamber 51. The base tube 76 defines a passage 78 therethrough opening into the scrubbing chamber 51 and the outboard end of tube 76 defines an abutment surface 79 thereon normal to the central axis $A_H$ of tube 76. A mounting cap 80 defining an abutting end surface 81 thereon is mounted on the outboard end of the base tube 76 with the abutting end surface 81 against the abutment surface 79 on base tube 76. The mounting cap 80 is closed at its outboard end and mounts a liquid supply tube 82 therethrough extending into the passage 78 in base tube 76. The inboard end of the liquid supply tube 82 mounts a spray nozzle 84 thereon so that the discharge end of the spray nozzle 84 is about flush with the inside surface of housing side wall 52 to prevent build-up on the nozzle 84.

Similarly to the nozzle assemblies 32, the base tube 76 defines an outwardly opening recess 41 therearound adjacent the abutment surface 79 and oriented generally normal to axis $A_H$ while the mounting cap 80 defines an outwardly opening recess 42 therearound adjacent the abutting end surface 81 and lying in a plane normal to the cap axis. This permits the tubular gasket 44 with annular projections 45 to be slipped over the joint between the cap 80 and base tube 76 so that the projections 45 fit in recesses 41 and 42. The adjustable clamping ring 46 is used to compress the gasket 44 to seal the joint between base tube 76 and cap 80, yet allows the liquid supply tube 82 and spray nozzle 84 to be removed with cap 80 for cleaning.

As best seen in FIGS. 1 and 2, each of the liquid supply tubes 82 is connected to the cleaning liquid supply system 16 through appropriate valves V. Thus, cleaning liquid is supplied to the nozzles 84 which spray the cleaning liquid into the flue gas flowing through the scrubbing chamber 51. The cleaning liquid has the capability of absorbing sulfur dioxide from the flue gas stream. Typically, caustic soda (NaOH) or soda ash ($Na_2CO_3$) solutions are used for this purpose. As the sprays of cleaning liquid fall downwardly across the flue gas stream, the turbulence generated in the gas stream by the baffle assemblies 60 enhances the contact between the cleaning liquid and the gas stream so that good sulfur dioxide absorption rates are maintained even though the spray nozzles 84 are of the low pressure type. Further, the sulfur dioxide absorption rate of the cleaning liquid decreases as sulfur dioxide is absorbed during passage of the cleaning liquid downwardly across the flue gas stream. Thus, more sulfur dioxide is absorbed in the upper portions of chamber 51 than in the lower portions. This phenomenon is offset, however, because the baffle assemblies 60 rotate the flue gas stream about the chamber axis $A_C$ so that all portions of the flue gas stream are exposed to the sprays of cleaning liquid in the upper portion of the scrubbing chamber 51 for about the same period of time.

The cleaning liquid supply system 16 seen in FIGS. 1 and 2 includes a holding tank 85 which a circulation pump 86 for supplying the cleaning liquid from tank 85 to a distribution manifold 88. The nozzle assemblies of the quench section 12 and the scrubber section 14 are all individually connected to the manifold 88 through the valves V. A return manifold 89 communicates with the bottom of the scrubbing chamber 51 to return the cleaning fluid to the holding tank 85 for recirculation.

The scrubber section 14 also includes a mist eliminator 90 seen in FIGS. 3, 4 and 9–14. The mist eliminator 90 is located in the downstream end of the scrubbing chamber 51 so that the flue gases pass therethrough after passage by the flow straightening baffle 70. The mist eliminator 90 serves to remove liquid droplets of the cleaning liquid from entrainment in the flue gas stream. The mist eliminator 90 operates according to the principles of a chevron-type mist eliminator by deflecting the gas stream back and forth along zigzag paths therethrough to cause the liquid droplets to impinge on the mist eliminator and be separated from the gas stream.

The mist eliminator 90 includes a mounting ring 91 positioned at the downstream end of the scrubbing chamber 51 and mounted on side wall 52 of housing 50 so that the mounting ring 91 is oriented normal to the chamber axis $A_C$. A mist eliminator plate assembly 92 is mounted on the mounting ring 91 with blinding plates 94 and mounting tabs 95 so that the plate assembly 92 projects upstream of the mounting ring 91.

Figure 9:
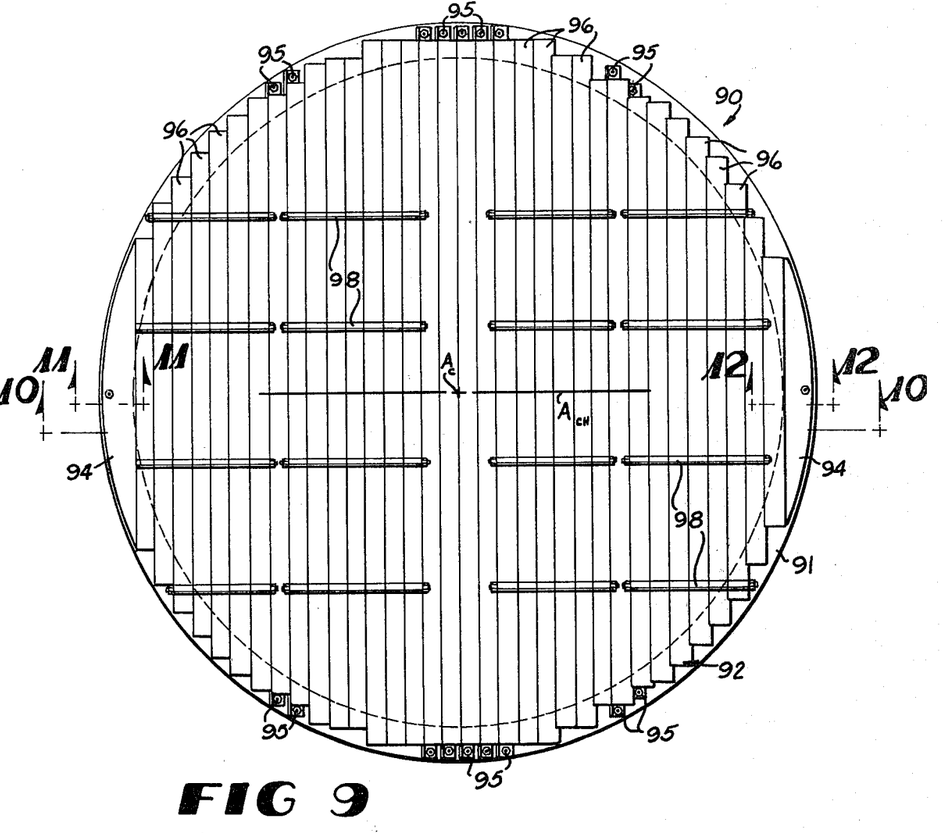
FIG. 9 is an enlarged inlet end view of the chevron-type mist eliminator of the invention.
Figure 10:
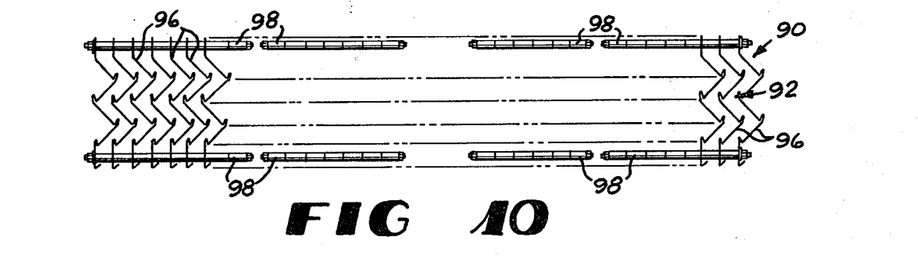
FIG. 10 is a transverse cross-sectional view taken generally along line 10—10 in FIG. 9.
Figure 11:
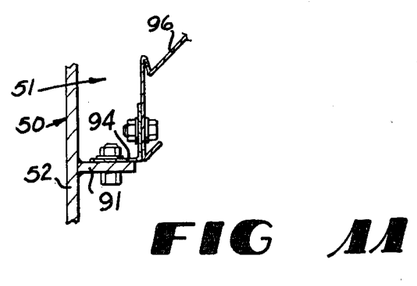
FIG. 11 is an enlarged transverse cross-sectional view taken generally along line 11—11 in FIG. 9.
Figure 12:
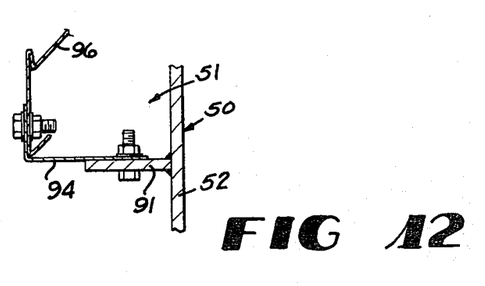
FIG. 12 is an enlarged transverse cross-sectional view taken along line 12—12 in FIG. 9.

The mist eliminator plate assembly 92 includes a plurality of vertically oriented mist eliminator plates 96 arranged in a spaced apart side-by-side relationship across the scrubbing chamber 51 so that the flue gas stream passes between the plates 96. The plates 96 have different lengths and are vertically centered on the horizontal transverse axis $A_{CH}$ of the scrubbing chamber 51 so that both ends of each of the mist eliminator plates overlap the mounting ring 91. The mist eliminator plates 96 are assembled in subassemblies on horizontally extending spacer units 98 at the upstream and downstream edges of the plates 96 as best seen in FIGS. 9 and 10. The blinding plates 94 are connected to and support the rightmost and leftmost mist eliminator plates 96 as seen in FIGS. 9–12 while at the same time blocking the gas stream flow around the outside of these mist eliminator plates 96.

Figure 13:
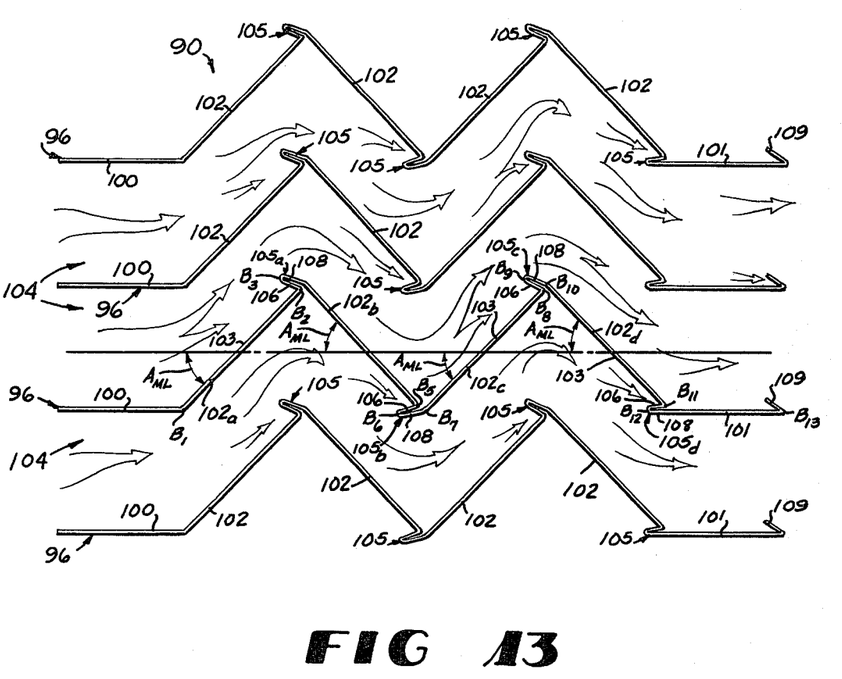
FIG. 13 is an enlarged top view of a group of mist eliminator plates of the chevron-type mist eliminator section.
Figure 14:
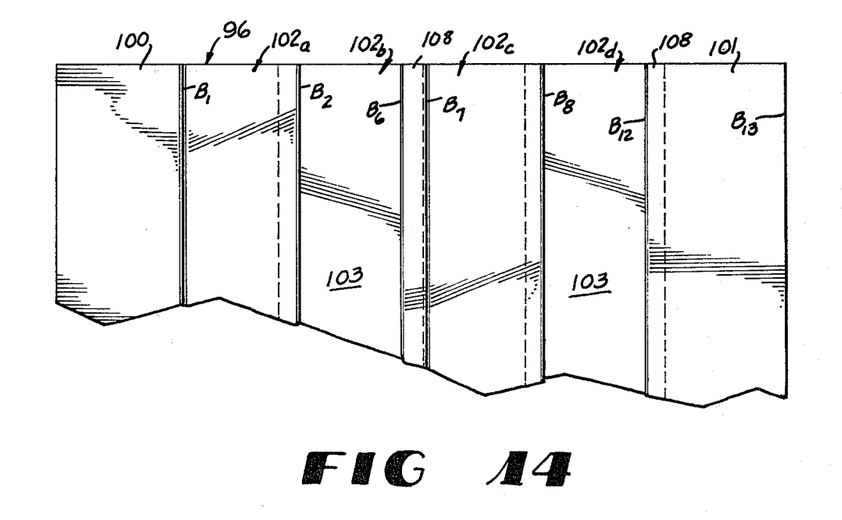
FIG. 14 is an enlarged partial side elevational view of one of the mist eliminator plates.

As best seen in FIGS. 13 and 14, each of the mist eliminator plates 96 is formed from a single sheet of metal, preferably of the non-corrosive type such as stainless steel. Each plate 96 is formed into an upstream planar section 100, a downstream planar section 101 and a plurality of angled planar sections 102 therebetween. The upstream and downstream planar sections 100 and 101 are oriented so that they are parallel with the axis $A_C$ of the scrubbing chamber 51 when viewed vertically as in FIG. 13 while the angled planar sections 102 are arranged in a zigzag fashion therebetween so that adjacent mist eliminator plates 96 define a zigzag subpassage 104 therebetween through which the flue gases flow. Thus, it will be seen that the angled planar sections 102 angle from the axis $A_C$ of the scrubbing chamber 51 at a common angle $A_{ML}$ but alternately in the opposite sense with respect to the scrubbing chamber axis $A_C$. For sake of clarity, the angled planar sections have been labelled $102_a$–$102_d$ as one moves along the plate 96 in the direction of gas flow. It will be seen that each of the angled planar sections 102 has an upstream facing surface 103. Because the angle of the sections 102 alternate, the upstream facing surface 103 on every other angled section 102 face upstream in the subpassage 104 on one side of the plate 96 while the upstream facing surface 103 on the angled sections therebetween face upstream in the subpassage 104 on the opposite side of the plate 96. Thus, the surfaces 103 on angled sections $102_a$ and $102_c$ face upstream in the gas subpassage 104 on one side of plate 96 while surfaces 103 on angled sections $102_b$ and $102_d$ face upstream in the gas subpassage 104 on the opposite side of plate 96.

The downstream edge of the upstream planar section 100 is integrally connected to the upstream edge of the angled planar section $102_a$ through vertically extending bend $B_1$. A vertically extending liquid collecting flange section $105_a$ integrally connects the downstream edge of the angled planar section $102_a$ with the upstream edge of the angled planar section $102_b$. The flange section $105_a$ includes a leg 106 connected to angled section $102_a$ through vertically extending bend $B_2$ so that leg 106 projects upstream of the upstream facing surface on angled section $102_a$ into the gas stream subpassage 104 on one side of plate 96. Flange section $105_a$ also includes a leg 108 folded back over leg 106 and integrally connected thereto by bend $B_3$ along the upstream edge of leg 106. The leg 108 is integrally connected to the upstream edge of the angled section $102_b$ through vertically extending bend $B_4$. Thus, it will be seen that any liquid droplets impinging on the upstream facing side of the angled planar section $102_a$ will flow thereacross to the flange section $105_a$ and then flow downwardly along flange section $105_a$ to the bottom of scrubbing chamber 51.

A vertically extending liquid collecting flange section $105_b$ integrally connects the downstream edge of the angled planar section $102_b$ with the upstream edge of the angled planar section $102_c$. Flange section $105_b$ includes a leg 106 connected to the angled section $102_b$ through vertically extending bend $B_5$ so that leg 106 projects upstream of the upstream facing surface of angled section $102_b$ in the gas stream subpassage 104 on the opposite side of plate 96. Flange section $105_b$ also includes a leg 108 folded back over leg 106 and integrally connected to the upstream edge of leg 106 by bend $B_6$. The leg 108 is integrally connected to the upstream edge of the angled section $102_c$ through bend $B_7$. Thus, any liquid droplets impinging on the upstream facing side of the angled planar section $102_b$ will flow thereacross to the flange section $105_b$ and then flow downwardly along flange section $105_b$ to the bottom of the scrubbing chamber 51.

A vertically extending liquid collecting flange section $105_c$ integrally connects the downstream edge of the angled planar section $102_c$ with the upstream edge of the angled planar section $102_d$. Flange section $105_c$ includes leg 106 integrally connected to the downstream edge of angled section $102_c$ through vertically extending bend $B_8$ so that leg 106 projects upstream of the upstream facing surface on angled section $102_c$ into gas stream subpassage 104 on the one side of plate 96 in which flange section $105_a$ is located. Flange section $105_c$ also includes leg 108 folded back over leg 106 and integrally connected to the upstream projecting edge of leg 106 by bend $B_9$. The downstream edge of leg 108 is integrally connected to the upstream edge of the angled section $102_d$ through bend $B_{10}$. Thus, any liquid droplets impinging on the upstream facing side of the angled planar section $102_c$ will flow thereacross to the flange section $105_c$ and then flow downwatdly along flange section $105_c$ to the bottom of the scrubbing chamber 51.

A vertically extending liquid collecting flange section $105_d$ integrally connects the downstream edge of the angled planar section $102_d$ with the upstream edge of the downstream planar section 101. Flange section $105_d$ includes leg 106 integrally connected to the downstream edge of the angled section $102_d$ through vertically extending bend $B_{11}$ so that leg 106 projects upstream of the upstream facing surface on angled section $102_d$ into the gas stream subpassage 104 on the opposite side of plate 96 in which flange section $105_b$ is located. Flange section $105_d$ also includes a leg 108 folded back over leg 106 and integrally connected to the upstream projecting edge of leg 106 by bend $B_{12}$. The leg 108 is co-planar with the downstream section 101 with the downstream edge of leg 108 integral with the upstream edge of section 101.

The downstream edge of the downstream planar section 101 is integrally connected to a flange lip 109 through vertically extending bend $B_{13}$ so that flange lip 109 projects upstream into the gas subpassage 104 on the one side of the plate 106 in which flange sections $105_a$ and $105_c$ are located. Thus, any liquid droplets that impinge on that side of the section 101 in the gas subpassage 104 on the one side of plate 96 will flow thereacross to the flange lip 109 and then flow downwardly to the bottom of scrubbing chamber 51.

In summary, it will be seen that the upstream facing surfaces 103 on the angled planar sections 102 are alternately located in the gas stream subpassages 104 on opposite sides of the mist eliminator plate 96. The angled planar sections 102 are integrally connected by the liquid collecting flange sections 105 formed of legs 106 and 108 folded back over each other so that one of the flange sections 105 is located at the downstream edge of each of the upstream facing surfaces 103 on the angled planar sections 102 to collect liquid impinged thereon as the flue gases flow through the zigzag gas subpassages 104 between plates 96.

After the flue gases have passed through the mist eliminator 90 for the removal of the liquid droplets therefrom, they pass out of the scrubber section 14 via the outlet pipe 58 into the fan section 15. The fan section 15 is an axial flow fan and serves to drawn the flue gas stream from the steam boiler SB through the quench section 12 and scrubber section 14 to operate same. It has been found that the pressure drop in the scrubber section 14 is about two to three inches water gauge which is is less than one-half that associated with prior art baffle type scrubbers. This reduces the power consumption of the fan section 15 to about one-half that associated with prior art baffle type scrubbers and thus minimizes the operating cost of the scrubbing system 10. In some instances, the steam boiler SB generates sufficient pressure in the exhaust gas stream to operate the scrubbing system 10 without fan section 15.

The flue gases are discharged from the fan section 15 into the inlet pipe 110 of the discharge stack section 18 so that the flue gases are free to flow upwardly out of the vertical stack 111.

It will also be appreciated that the scrubber section 14 can be oriented so that the axis $A_C$ of the scrubbing chamber 51 is vertical. The quench section 12 would be appropriately modified to introduce the flue gases into the lower end of scrubber section 14 and the mist eliminator 90 re-oriented slightly so that the collected liquid would drain to one side of the scrubbing chamber.

Figure 15:
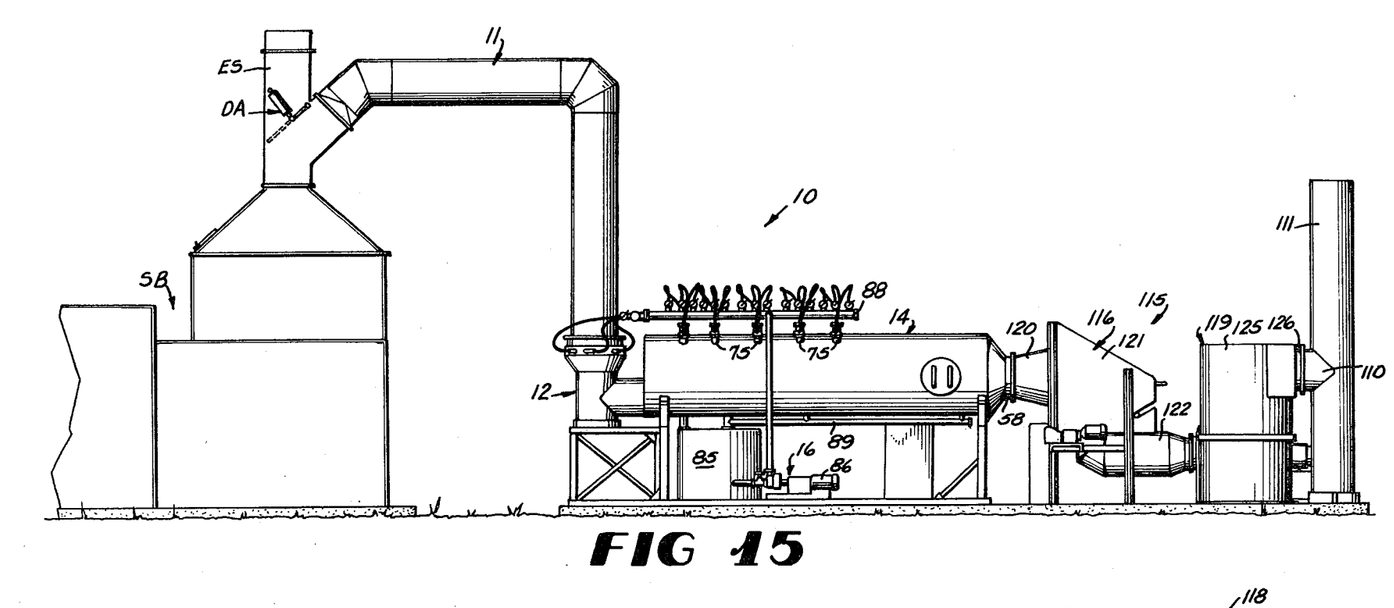
FIG. 15 is a side elevational view showing another installation incorporating the invention.
Figure 16:
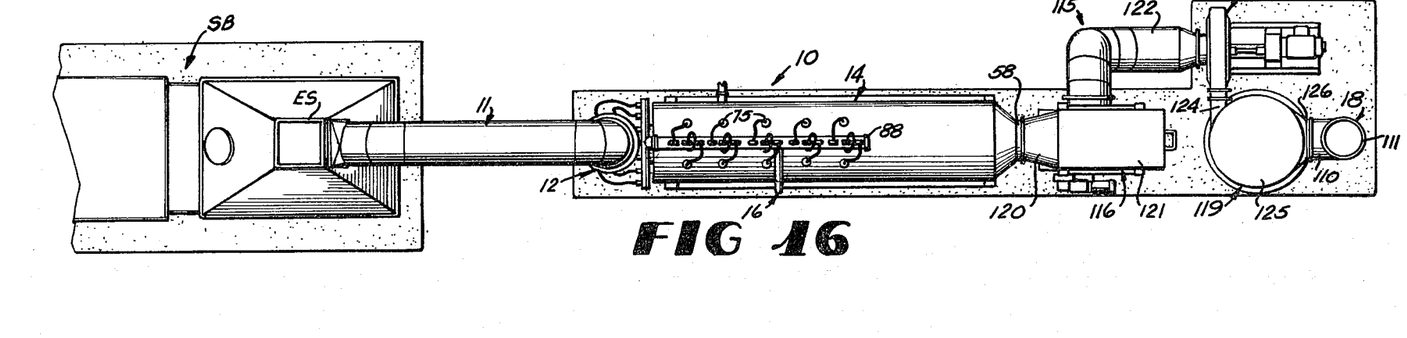
FIG. 16 is a top plan view of the installation shown in FIG. 15.

An alternate installation is shown in FIGS. 15 and 16 wherein a filtration section 115 has been substituted for the fan section. The filtration section 115 includes a filter unit 116, a centrifugal fan 118 and a cyclone 119. The filtration section 115 operates in the high energy regime to remove submicron as well as larger size liquid and solid particles from the flue gas stream in accordance with the principles set forth in U.S. Pat. No. 3,745,748.

The filter unit 116 includes an inlet pipe 120 connected to the outlet pipe 58 from scrubber section 14, a housing 121 which movably mounts a fibrous mat through which the gas stream passes for separation of the particulates from the flue gas stream and a discharge duct 122 from the housing 121 through which the flue gas stream is discharged after passage through the fibrous mat in housing 121. It will be noted that the flue gas stream is discharged from the housing 121 at right angles to that at which it enters housing 121.

The discharge pipe 122 is connected to the inlet of fan 118 which forces the flue gas stream through the fibrous mat in housing 121 with a sufficient pressure drop, usually 15–30 inches water gauge, to cause the filter unit 116 to operate in the high energy regime as mentioned above. The discharge of fan 118 is connected to the tangential inlet 124 of the cyclone 119 so that the flue gas stream is forced tangentially into one end of the cyclone chamber in the cyclone housing 125 to separate any liquid droplets that have agglomerated in the fibrous mat in filter unit 116 and then blown off into the flue gas stream discharged from the filter unit 116. The flue gas stream exits that end of cyclone housing 125 opposite inlet 124 through discharge duct 126. The discharge duct 126 is connected to the inlet pipe 110 of the discharge stack section 18 so that the flue gases are free to flow upwardly out of the vertical stack 111.

What is claimed as invention is:

1. Gas scrubbing apparatus for removing sulfur dioxide from a gas stream with a cleaning liquid capable of absorbing the sulfur dioxide in the gas stream comprising:

a housing defining an elongate scrubbing chamber therein along a central axis, an inlet to said scrubbing chamber through one end of said housing, and an outlet from said scrubbing chamber through the opposite end of said housing so that the gas stream enters said scrubbing chamber through said inlet, flows along the length of said scrubbing chamber and passes out of said scrubbing chamber through said outlet; said scrubbing chamber having a cross-sectional area larger than the cross-sectional area of said inlet;

a plurality of first baffles mounted on said housing within said scrubbing chamber at longitudinally spaced positions along said scrubbing chamber, each of said first baffles oriented generally perpendicular to the central axis of said scrubbing chamber, defining an outer peripheral edge thereon attached to said housing and extending around about one-half of the cross-sectional periphery of said scrubbing chamber, defining a generally straight inner edge thereon extending between opposite ends of said outer peripheral edge so that said inner edge extends through the middle of said scrubbing chamber, and having a size such that each of said first baffles blocks about fifty percent of the transverse cross-sectional area of said scrubbing chamber, each of said first baffles being rotated in a first direction about said chamber central axis ninety degrees with respect to the next adjacent first baffle upstream thereof so that said inner edge on each of said first baffles is oriented perpendicular to said inner edges of said first baffles adjacent thereto whereby each of said first baffles rotates the gas stream flowing thereby approximately ninety degrees and so that all of said first baffles rotate the gas stream in the same direction about said central axis to effectively rotate the gas stream about three hundred sixty degrees about said central axis as said gas stream flows past said first baffles;

a second baffle mounted in said housing downstream of the downstreammost of said first baffles; said second baffle oriented generally perpendicular to the central axis of said scrubbing chamber, defining an outer peripheral edge thereon attached to said housing and extending around about one-half of the cross-sectional periphery of said scrubbing chamber, defining a generally straight inner edge thereon extending between opposite ends of said outer peripheral edge so that said inner edge extends through the middle of said scrubbing chamber, and having a size such that said second baffle blocks about fifty percent of the transverse cross-sectional area of said scrubbing chamber; and said second baffle being rotated about said chamber central axis about one hundred eighty degrees with respect to the downstreammost of said first baffles so that said second baffle arrests rotation of the gas stream about said central axis; and spray means for directing sprays of the cleaning liquid between said first baffles for contacting the gas stream with the cleaning liquid to absorb the sulfur dioxide from the gas stream.

2. The gas scrubbing apparatus of claim 1 wherein said scrubbing chamber has a circular cross-section and wherein each of said first baffles and said second baffle is semi-circular with said generally straight inner edge on each extending generally diametrically of said scrubbing chamber.

3. The gas scrubbing apparatus of claim 2 wherein said scrubbing chamber is generally horizontally oriented and wherein said spray means direct said sprays of liquid from the top of said scrubbing chamber toward the bottom thereof.

4. The gas scrubbing apparatus of claim 2 further including a plurality of adjustable baffle plates, each of said adjustable baffle plates adjustably mounted on one of said first baffles to adjustably extend into said scrubbing chamber past said inner edge of said first baffle, each of said adjustable mounting plates having a length less then the length of said inner edges of said first baffles so that the gas stream flows over and around that portion of each of said adjustable baffle plates projecting past said inner edge of said first baffle mounting same to increase the turbulence in the gas stream flowing thereby.

5. The gas scrubbing apparatus of claim 4 wherein each of said adjustable baffles includes a plurality of elongate slots therein and wherein each of said first baffles mounting one of said adjustable baffles further includes connection means adapted to extend through said elongate slots in said adjustable baffle so that said adjustable baffle can be selectively shifted with respect to said connection means and said first baffle to adjustably position said adjustable baffle with respect to said first baffle.

6. The gas scrubbing apparatus of claim 1 further including mist separation means in said scrubbing chamber downstream of said baffles and said spray means for removing droplets of the cleaning liquid from said gas stream.

7. The gas scrubbing apparatus of claim 6 for additionally removing particulates from the gas stream further including particulate removal means for separating entrained particulates from the gas stream after passage through said mist separation means and fan means for forcing the gas stream through said particulate removal means to cause said particulate removal means to separate the particulates from the gas stream.

8. The gas scrubbing apparatus of claim 6 wherein said mist separation means includes a plurality of generally vertically extending, spaced apart mist eliminator plates mounted in said housing and extending across said scrubbing chamber generally normal to said central axis so that said mist eliminator plates define subpassages therebetween through which the gas stream flows along a zigzag path, each of said mist eliminator plates being a unitary sheet of material, a plurality of angled planar sections and a plurality of flange sections being formed in said mist eliminator plate with said flange sections integrally connecting said angled sections and projecting into one of said subpassages, each of said flange sections including a pair of legs integrally joined with each other and folded back over each other to a juxtaposed position so that liquid droplets separated from the gas stream onto said angled sections flow along said angled sections to said flange sections and then along said flange sections for separation from the gas stream.

9. The gas scrubbing apparatus of claim 8 wherein each of said angled sections of said mist eliminator plates includes vertically extending upstream and downstream edges; wherein one of said legs of each of said flange sections is integrally connected to the downstream edge of one of said angled sections and wherein the other of said legs is integrally connected to the upstream edge of said angled section immediately downstream of said first mentioned angled section.

* * * * *